United States Patent Office 3,539,763
Patented Nov. 10, 1970

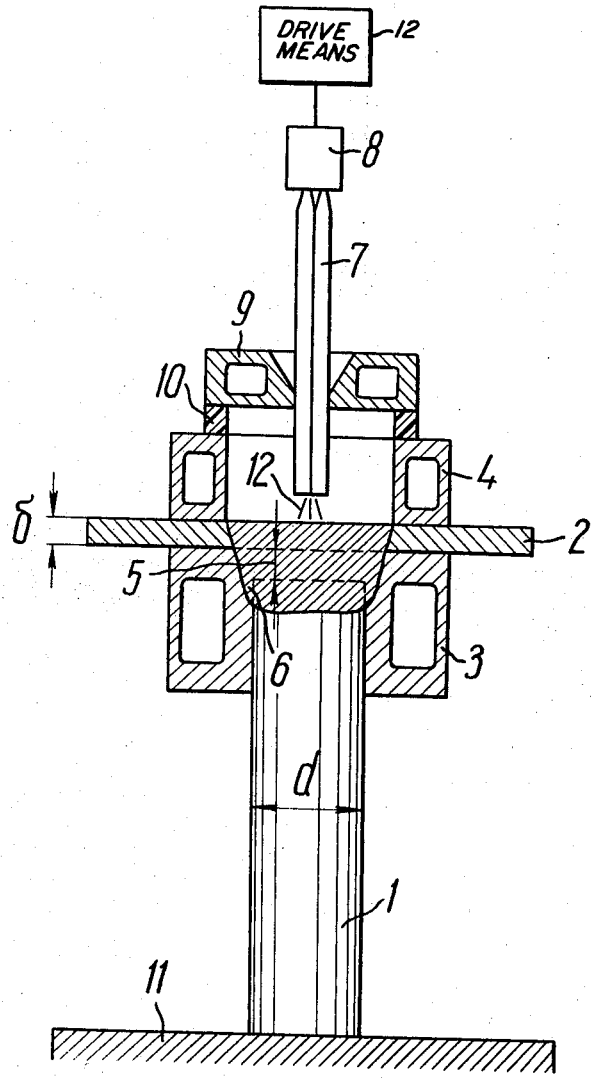

3,539,763
METHOD OF ARC WELDING OF BARS WITH SHEET OF PROFILED MEMBERS AND A DEVICE FOR EFFECTING SAME
Arkady Yakovlevich Brodsky, B. Cherkizovskaya ulitsa 4 kvartal 4, kv. 51, and Leonid Nikolaevich Skorokhodov, Perovskoe shosse 26, kv. 2, both of Moscow, U.S.S.R.
Filed July 13, 1967, Ser. No. 653,183
Int. Cl. B23k 9/00
U.S. Cl. 219—137                                6 Claims

ABSTRACT OF THE DISCLOSURE

Arc welding is achieved by continuously advancing a consumable electrode into a member, which is to be welded to a bar, while maintaining an arc between the electrode and member to cause melting of the member in the region of the arc, the electrode ultimately passing through the member to cause melting of an underlying bar whereby the molten material fills a cavity in a mould, in which the bar is inserted and the member placed against, so that upon cooling a fused welded connection is obtained between the bar and member.

---

The present invention relates to a method of arc welding of bars with elements of sheet or sectional form, for example, for making T-shaped joints in machine parts, welded parts such as used in reinforced concrete structures, as well as for other similar parts featuring similar joints between bars and sheet or sectional members; and to a device for effecting same.

Known in the prior art is a method of automatic arc welding of T-shaped joints of bars with plates under a layer of flux. See, for example, the book by A. Brodsky, "A Quasi-Arc Welding of T-Shaped Joints of Parts to be Embedded Used in Prefabricated Reinforced Concrete Structures," Moscow, 1961.

Said method does not ensure good welding of T-joints with the plate thickness $\delta$ to bar diameter $d$ ratio $\delta/d \leq 0.60$, and does not enable making three dimensional structures, consisting of a plurality of bars, with plates welded to both ends thereof, in particular parts to be embedded, of the type called "a closed table." Until recently, the manufacture of the above-said welded joints was associated with the use of a method of manual arc welding which is both low in efficiency and high in labor requirements and involves a preliminary boring and counter sinking of holes in the plates followed by the machining of welding spots flush with the plate face.

The manual arc welding, however, does not ensure the required quality of welded T-shaped joints on account of a specific pattern of the welded joint (circular, of limited length with a deep two-side preparation of the hole edges).

The principal object of the invention is to automate the process of welding bars having a diameter $d$ to flat members with the thickness $\delta$ and the ratio $\delta/d<0.6$, and thus to ensure the manufacture of the above-said three-dimensional structures.

In conformity with the present invention, this object is accomplished in the proposed method of arc welding of bars to sheet or sectional members in that each bar is positioned with one end to a split mould, having a groove, while the member to be welded is disposed in such a manner as to provide a clearance between the bar in the split mould and the member itself; thereupon, the member is melted through by an electric arc with the help of electrodes, the portion of the bar to be welded is melted, the molten electrode metal fills the groove of the split mould and the hole fused in the member is filled flush with the face thereof.

To carry in to effect said method, provision is made for a device with a movable electrode holder having a guiding arrangement for centering the electrode with respect to the axis of the bar which is disposed in the split mould and to which the member is welded, and a pressing device forcing said member against the top of the split mould.

The details of the present invention will become more fully apparent from a consideration of the following description thereof, taken in conjunction with the accompanying drawing, the sole figure of which shows in section a schematic representation of a device for effecting the method of arc welding of bars to sheet or sectional member.

As is shown in the drawing, a bar 1 and a sheet member 2 are positioned for welding by the aid of an externally cooled split copper mould 3 and a pressing device, in the form of a ring 4. The condition prerequisite for effecting the proposed method of welding is the presence of a clearance 5 between the upper end of the bar 1 and the sheet member 2, as well as an annual groove 6 of a certain volume in the split mould 3.

The bar 1 is clamped in the split mould 3, while the sheet member 2 is pressed at its top by means of mechanical or pneumatic devices (not shown in the drawing).

A bundle of electrodes 7 is clamped in an electrode holder 8 with an insert piece therebetween (not shown in the drawing), the bundle of the electrodes passing through a hole in a guiding device 9 which imparts a required arrangement to the bundle of electrodes 7 and centers it with respect to the axis of the bar 1 to be welded to the sheet member 2, which is positioned in the split mould 3. The guiding device, also cooled externally, is rigidly connected to the pressing ring 4 by means of uprights 10 made of a heat-resisting dielectric material.

The required value of the clearance 5 between the end of the bar 1 and the sheet member 2 in the embodiment described herein can be obtained by the aid of a supporting device 11.

The process of welding is effected in the following manner.

An electric arc 12 is stricken between the bundle of electrodes 7 and the surface of the sheet member 2. Upon striking the arc, the bundle of electrodes 7 is sunk into the welding bath, as formed on the surface of the sheet member 2, fusing it through. A through hole is formed thereby in the sheet member 2 at the spot where the welding arc is burning. To provide for a continuous process of welding of the sheet member 2 to bar 1, the bundle of electrodes 7 is fed into the welding bath with a constant force by means of a mechanical or other feed drive diagrammatically shown at 12 in the drawing.

The molten metal of the sheet member 2 and electrodes 7 fills the annular clearance 5 between the walls of the groove 6 of the split mould 3 and side surface of the portion of the bar 1 which is found in the groove 6 of the split mould.

Then the upper end of the bar 1 is subjected to the action of the electric arc 12, which portion is partially melted. The formation of a welded T-joint between rod 1 and the sheet member 2 is carried into effect when the electrode metal is being melted, which fills the groove 6 in the split mould 3 and the through hole fused in the sheet member 2. At all these stages of the welding process with the deep fusion, the bundle of electrodes is continuously fed downwards with a certain force and predetermined rate. The welding process is completed by fusing the crater with the natural breakage of the electric arc upon its appearance on the surface of the sheet member 2. The feed of the bundle of electrodes stops and there occurs the fusion of the crater flush with the face of the member 2.

The proposed method of welding allows the automation of the welding process in the manufacture of various machine parts and structural elements, which comprise welded T-joints of bars with sheet or sectional members.

Such a method of welding with the use of deep fusion enables substituting of the manual arc welding by an automatic welding procedure when manufacturing the above welded joints. The latter features higher mechanical strength and a stable quality of the welded joints.

At present, said method of welding is regarded as unique, allowing the automation of the manufacture of metal structures of the "closed table" type.

Besides, the proposed method enables elimination of labor-consuming auxiliary operations, such as boring, countersinking of holes, machining of surfaces of plates after welding, and the method increases the productivity by as much as 40 to 60 percent as compared with that of manual arc welding.

The method of welding thus described may be employed in the manufacture of welded pieces to be embedded in reinforced concrete structures of residential and industrial buildings, in welded parts of ships and bridges, as well as in the manufacture of various machine parts of intricate patterns having welded T-joints of bars of various sizes and plates or flat rolled pieces.

We claim:

1. A method of arc welding a bar to an element said method comprising inserting an end of the bar into a cavity in a split mould, positioning the element to be welded to the bar on the upper surface of the split mould at said cavity in spaced relation with said bar, positioning a vertical consumable electrode above the element to be welded to the bar, producing an electric arc between the electrode and the element to be welded to the bar to cause the element to melt in the region of the arc, and continuously lowering the electrode into the melted region while maintaining the arc between the electrode and said element ultimately to cause the end of said bar to be melted by the molten metal of said element and mixed therewith and with said electrode in said cavity to fill the same and form, after cooling of the molten metal, a welded junction between said bar and said element, which junction is flush with the face of said element.

2. A method as claimed in claim 1 wherein said electrode is lowered along an axis which is coaxial with said bar.

3. A device for arc welding a bar to an element, said device comprising a split mould having a cavity; means supporting the bar such that one end of the bar is positioned in said cavity; a pressing device in the form of a ring with a hole, said pressing device forcing the element, to be welded to the bar, against the upper surface of said split mould to cover said cavity and be in spaced relation with said one end of the bar, the hole of said pressing device being coaxial with said cavity in said split mould; a vertical consumable electrode; a guiding means for positioning the electrode coaxially with the hole in said pressing device and with the cavity in said split mould; connection means constituted by heat resistant dielectric material between said guiding means and said pressing device; means for holding the electrode; means for vertically displacing, with substantial propelling force, said holding means and thereby the electrode through said guiding means and into the hole in the pressing device during the burning of an arc for producing a welded connection between the bar and the element.

4. A device as claimed in claim 3 comprising external cooling means for said split mould.

5. A device as claimed in claim 3 comprising external cooling means for said pressing device.

6. A device as claimed in claim 3 comprising external cooling means for said guiding means.

References Cited

UNITED STATES PATENTS

| 1,581,456 | 4/1926 | Lincoln | 219—136 |
| 2,175,026 | 10/1939 | Jones | 219—131 |

ANTHONY BARTIS, Primary Examiner

C. L. ALBRITTON, Assistant Examiner

U.S. Cl. X.R.

219—130